United States Patent
Ho et al.

(10) Patent No.: US 7,277,400 B2
(45) Date of Patent: Oct. 2, 2007

(54) METHOD OF MONITORING STATE OF A TELECOMMUNICATIONS NETWORK COMPRISING A PLURALITY OF NODES, AND A CORRESPONDING TELECOMMUNICATIONS NETWORK

(75) Inventors: Lester Tse Wee Ho, London (GB); Jonathan Michael Pitts, London (GB); Louis Gwyn Samuel, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 1127 days.

(21) Appl. No.: 10/382,398

(22) Filed: Mar. 6, 2003

(65) Prior Publication Data

US 2003/0169762 A1     Sep. 11, 2003

(30) Foreign Application Priority Data

Mar. 6, 2002    (GB) ............................... 0205284.3
Jun. 24, 2002   (GB) ............................... 0214520.9

(51) Int. Cl.
*H04J 1/16*    (2006.01)
(52) U.S. Cl. ........................ 370/252; 370/254
(58) Field of Classification Search ............... None
See application file for complete search history.

(56) References Cited

U.S. PATENT DOCUMENTS

| | | | |
|---|---|---|---|
| 5,596,722 A | 1/1997 | Rahnema | 395/200.15 |
| 6,411,809 B1 * | 6/2002 | Haakana et al. | 455/446 |
| 6,671,649 B2 * | 12/2003 | Kuwahara et al. | 702/150 |
| 6,707,790 B1 * | 3/2004 | Wu et al. | 370/230 |
| 6,745,039 B1 * | 6/2004 | Di Lalla | 455/458 |
| 6,873,600 B1 * | 3/2005 | Duffield et al. | 370/252 |
| 6,917,590 B1 * | 7/2005 | Oliva | 370/232 |
| 7,171,016 B1 * | 1/2007 | Rhoads | 382/100 |
| 2002/0093917 A1 * | 7/2002 | Knobbe et al. | 370/252 |
| 2002/0097686 A1 * | 7/2002 | Qiu | 370/252 |
| 2003/0064745 A1 * | 4/2003 | Benveniste | 455/522 |
| 2005/0152272 A1 * | 7/2005 | Bjoerkman et al. | 370/235 |
| 2006/0187119 A1 * | 8/2006 | Hall et al. | 342/387 |

FOREIGN PATENT DOCUMENTS

WO    WO97/04605 A1    2/1997
WO    WO 02/03628 A2   1/2002

OTHER PUBLICATIONS

Toru Otsu, et al, "Network Architecture for Mobile Communications Systems Beyond IMT-2000", *IEEE Personal Communications*, (Oct. 2001) pp. 31-37.

(Continued)

*Primary Examiner*—Andrew C. Lee

(57) ABSTRACT

The state of a telecommunications network comprising a plurality of nodes is monitored. Each node is at a time in one of a number of node states dependent upon a predetermined set of rules and local conditions at that node. The value of a parameter is determined where the value of the parameter is dependent upon the entropy of the node states in the network.

10 Claims, 7 Drawing Sheets

State transition diagram of base station

OTHER PUBLICATIONS

Yasushi Yamao, et al, "Radio Access Network Design Concept for the Fourth Generation Mobile Communication System", *IEEE VTC2000*, pp. 2285-2289.

Aurelian Bria, et al, "4th-Generation Wireless Infrastructures: Scenarios and Research Challenges", IEEE Personal Communications, (Oct. 2001), pp. 25-31.

Jun-Zhao Sun, et al, "Features in Future: 4G Visions from a Technical Perspective", *2001 IEEE*, pp. 3533-3537.

B. G. Evans, et al, "Visions of 4G", *Electronics & Communication Engineering Journal*, (Dec. 2000), pp. 293-303.

"Book of Visions 2001—Version 1.0", *Wireless World Research Forum*, (Dec. 2001), pp. ii-279.

Bangnan Xu, et al, "Design issues of Self-Organizing Broadband Wireless Networks", *Communication Networks, Aachen Univ. of Technology*, Kopernikusstr. 16, D-52074, Germany, 7 pages.

James P. Crutchfield, "The Calculi of Emergence: Computation, Dynamics, and Induction", *Proceedings of he Oji International Seminar*, (Apr. 5-9, 1993) pp. ii-54.

Peter Grassberger, "Toward a Quantitative Theory of Self-Generated Complexity", *International Journal of Theoretical Physics*, vol. 25, No. 9, (1986), pp. 907-939.

R. Lopez-Ruiz, et al, "A statistical measure of complexity", *Physics Letters A 209*, (1995), pp. 321-326.

J. S. Shiner, et al, "Simple measure for complexity", *Physical Review E*, vol. 59, No. 2, (Feb. 1999), pp. 1459-1464.

Per Bak, et al, "Self-organized criticality", *Physical Review A*, vol. 38, No. 1, (Jul. 1988), pp. 364-373.

Ricard V. Sole, et al, "Information Transfer and Phase Transitions in a Model of Internet Traffic", *Santa Fe Institute*, 1399 Hyde Park Road, New Mexico 87501, (2001), pp. 1-7.

\* cited by examiner

State transition diagram of base station

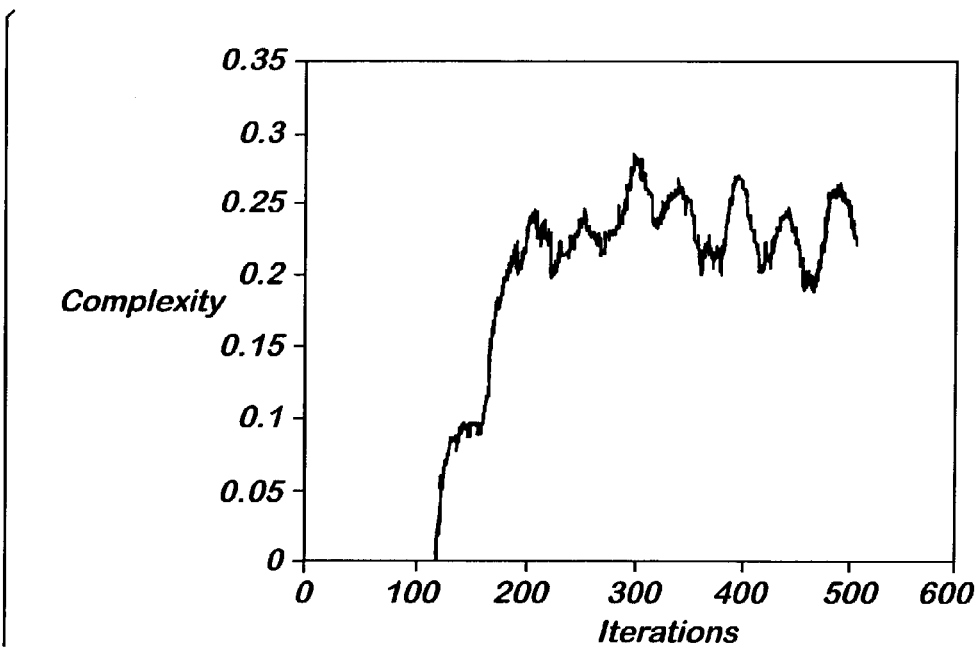
Fig. 4(a)
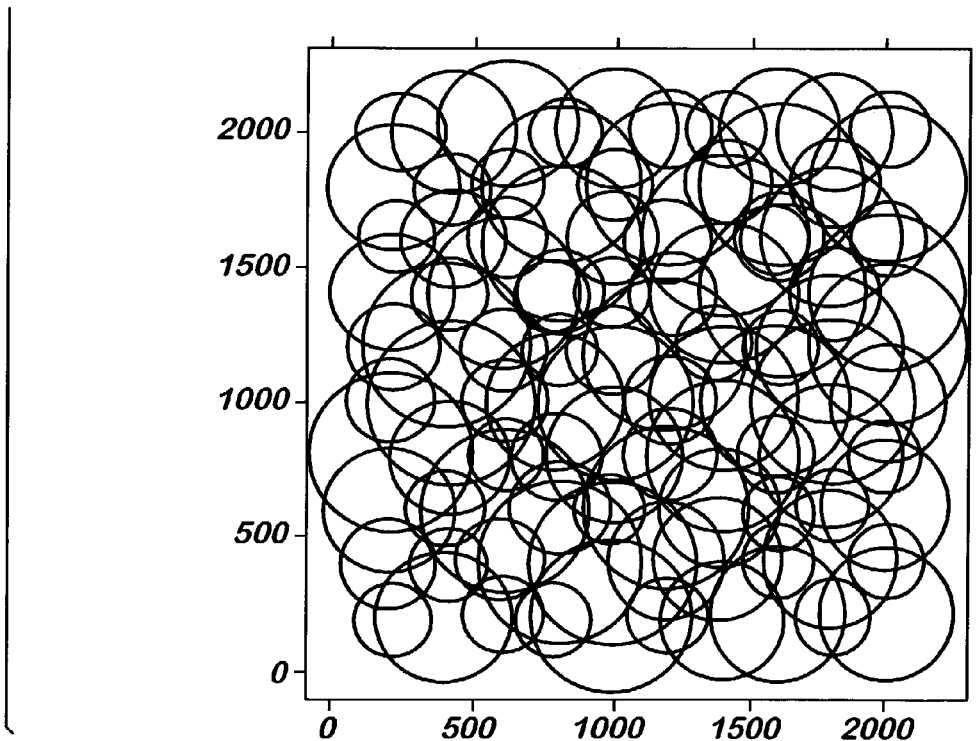

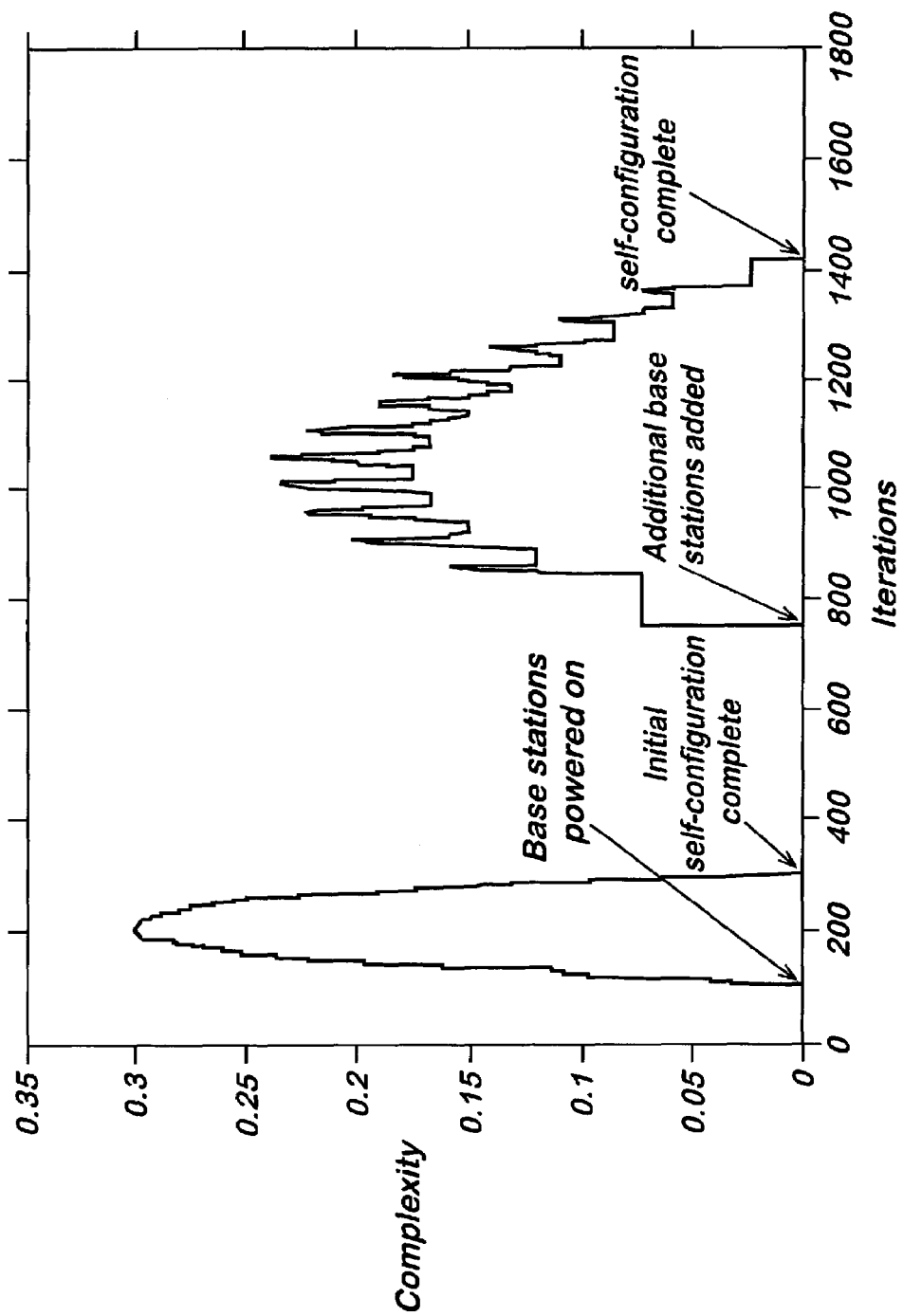

METHOD OF MONITORING STATE OF A TELECOMMUNICATIONS NETWORK COMPRISING A PLURALITY OF NODES, AND A CORRESPONDING TELECOMMUNICATIONS NETWORK

CROSS REFERENCE TO THE RELATED APPLICATION

This application claims priority of Great Britain Application No. 0214520.9, filed Jun. 24, 2002, and also Great Britain Provisional Application No. 0205284.3, filed Mar. 6, 2002.

TECHNICAL FIELD

The present invention relates to monitoring the state of a telecommunications network comprising a plurality of nodes. The present invention also relates to a telecommunications network comprising a complexity determinator and plurality of nodes.

BACKGROUND OF THE INVENTION

Mobile telecommunications networks are mostly now centrally-controlled, but are evolving towards more ad-hoc and dynamic structures with cheap, low-powered nodes, such as base stations, that are auto-configurable and flexible. Controlling such networks means coping with uncertainty, not only in traffic demand but also in the structure of the network itself. Using decentralized control gives flexibility to respond locally to these uncertainties, creating self-organizing networks that rely on time-varying i.e. emergent behavior globally across the network so as to provide network-wide co-ordination. Compared with more easily monitored centrally-controlled networks, however, these decentralized networks can be difficult to predict or manipulate.

Mobile networks are expected to be used less for voice-oriented services and more for data services. As the anticipated demand for data oriented applications increases, so-called 3G systems (i.e those in accordance with Third Generation Partnership Project 3GPP standards) are expected to meet the demand as they evolve into future generation, or fourth generation (4G) networks. In order to accommodate the larger amount of traffic, 4G networks are expected to use a higher frequency band and offer channels that have bit rates that are ten times higher than that of 3G systems, as mentioned in T. Otsu, I. Okajima, N. Umeda, Y. Yamao, "Network architecture for mobile communications systems beyond IMT-2000", IEEE Personal Communications, volume 8, number 5, pages 31-37, October 2001. The high data transmission rates that are required will necessitate the use of smaller cell sizes, and hence, potentially cause a serious increase in the cost of the network infrastructure and the cost of planning and deploying the network, as outlined in Y. Yamao, H. Suda, N. Umeda, N. Nakajima, "Radio access network design concept for the fourth generation mobile communication system", IEEE 51$^{st}$ Vehicular Technology Conference Proceedings, 2000, VTC 2000-Spring Tokyo, volume 3, pages 2285-2289. This, among other reasons, has prompted suggestions to use cheap, low-powered devices that are highly flexible and are able to auto-configure to produce networks that are more ad-hoc and dynamic in structure, as described in various papers such as: A. Bira, F. Gessler, O. Queseth, R. Stridh, M. Unbehaun, J. Wu, J. Zander, "4$^{th}$-Generation wireless infrastructures: scenarios and research challenges", IEEE Personal Communications, volume 8, number 6, pages 25-31, December 2001, in J-Z. Sun, J. Sauvola, D. Howie, "Features in future: 4G visions from a technical perspective", Global Telecommunications Conference, 2001. GLOBECOM '01, volume 6, pages 3533-3537, in B. G. Evans, K. Baughan, "Visions of 4G", Electronics and Communications Journal, volume 12, number 6, pages 293-303, December 2000, and in Wireless World Research Forum, "Book of Visions 2001: Visions of the Wireless World", http://www.wireless-world-research.org/BoV1.0/BoV/BoV2001v1.0.pdf Decentralized control offers the flexibility and robustness needed to cope with the dynamic nature of such ad-hoc networks, and has many advantages over centralized control, as discussed in B. Xu, B. Walke, "Design issues of self-organizing broadband wireless networks", Computer Networks: the International Journal of Distributed Informatique, volume 37, number 1, pages 73-81, September 2001.

However for decentralized control, wireless networks would have to evolve to structures that have many similarities with high-speed wireless LANs. These networks would be built to carry all traffic through a common packet switch transport method (such as IP). Using high frequency bands to provide the required bandwidth, the maximum size of the cells would be a lot smaller than current systems because of the higher propagation loss.

Distributed (i.e decentralized) control of wireless networks is thus becoming increasingly important in the move towards self-configuring ad-hoc type networks for 3G (UMTS) and 4G networks. This ad-hoc approach to wireless networks relies on highly distributed nodes to create flexible and highly robust network. These nodes typically handle or have the capability to handle the control of the network, which in a normal wireless network would have been done by a central controller. Functions such as routing, resource management, and auto-configuration are aspects that can be handled by ad-hoc networks. One of the challenges with an ad-hoc type network is that the amount of overhead signalling that has to be done to coordinate the whole network without a central controller can be impractical, especially if the size of the network is large. In consequence, distributed algorithms are used that make use of localized information, i.e. where the network nodes make decisions based on very limited information on the network, often only considering the information of a few neighboring nodes. These localized algorithms often rely on the global behaviors that emerge out of the simple interactions between the network's nodes to produce the self-organization that keeps the networks in check.

One of the problems that arise from the use of such localized distributed algorithms (LDA) is that the interactions and behavior of the network, although giving the desired effect, are not always straightforward. When using a centralized control approach, the behavior of the network is always known and guided through algorithms contained in the controller. Since this is not available when using localized distributed algorithms (LDA), the behavior of the network can be difficult to predict and debug if the behavior starts to go out of hand, such as the synchronization problem found in the TCP/IP protocol, and the observation of criticality in self-organized systems. LDA's can also be very limited in their functionality. Often, the evolution of the behavior of the network is one directional, where the network self-organizes towards one type of behavior, which can limit the flexibility of the network.

Various techniques are known to be used to investigate the behavior of self-organizing systems so that a better understanding on the effects of various parameters of an LDA. These methods are usually used in the physical sciences field to examine emergent phenomena. For example, Crutchfield, J. P., "The Calculi of Emergence: Computation, Dynamics and Induction," Physica D, vol.75, no. 1-2, pp. 11-54 describes use of state reduction to extract a state transition model of the system to represent its behavior. The state reduction technique is quite complicated and requires a large sampling of the system behavior before a sufficiently accurate state transitional model can be obtained. Of course, as the sample size is not infinitely large, we can never determine for certain that the state transitional model that is produced is accurate enough.

Grasberger, P., "Toward a quantitative theory of self-generated complexity," International Journal of Theoretical Physics, vol.25, no. 9, pp. 907-938, September 1986.], Lopez-Ruiz R., Mancini H. L., Calbet X., "A statistical measure of complexity", *Physical Letters A*, pp. 321-326, 25 Dec. 1995] and Shiner J. S., Davison M., Landsberg P. T., "Simple measure for complexity", Physical Review E, vol. 59, no. 2, pp. 1459-1464, February 1999 are papers which all describe use of entropy measurements of the system states to quantify the behavior of the system in terms of state space. Entropy-based techniques capture the behavior of the system, but also require a large sampling size of the system states to produce an accurate picture of the behavior. This is because they consider the instantaneous state of the system, and not the overall trend of the behavior, thus requiring a longer time to build up a sufficient behavior representation.

Looking at the potential problems in distributed control of a wireless network, it was realized that changes needed to be made in the way current wireless networks are designed, deployed and maintained. The base stations have to be cheap, small and unobtrusive. To reduce the increased cost of deploying a larger number of cells, the base stations also need to have the ability to self-configure to a certain extent. The process of installing a base station should be simple and straightforward, with a "plug and play" approach to installation, with the base station self-configuring different aspects of its operation such as its cell size and routing. It was realized that decentralized control offers this level of flexibility in the network and also helps with solving the scalability and robustness issues, and further decrease the cost of the network by removing the need for expensive equipment otherwise needed in centrally controlled networks. But highly decentralized networks work on self-organizing behavior, and can be unpredictable and difficult to manipulate.

For large networks composed of simple, inexpensive and highly decentralized nodes to co-ordinate themselves, they would have to be self-organizing. Self-organizing systems have the ability to evolve and adapt to retain a certain co-ordinated behavior using only localized information and relatively simple rules. It is a behavior that relies on the emergent global behavior arising from the interactions between the sub-systems. It is a behavior that can be observed in many different systems, ranging from physical, biological, sociological and mathematical systems. A main characteristic of self-organizing systems is their ability to evolve towards the same behavior pattern no matter what the initial configuration of the system is. Self-organizing behavior would be useful applied to co-ordination of a network. One can imagine a network where the base stations, using basic rules, would be able to settle down to the same behavior regardless of what the initial conditions are during initial deployment, or what changes are made to the network.

While self-organization has a very promising application in wireless networks, there are several problems and challenges that can arise from the use of self-organizing networks. Even though self-organizing networks are able to maintain a co-ordinating behavior, under certain conditions, very sudden changes can occur. These sudden changes in the system behavior, sometimes called self-organized criticality, occurs when certain parameters of the system are changed and changes the principle behavior of the system, causing a phase transition, flipping it from, say, a static behavior to a chaotic one as described in P. Bak, C. Tang, K. Wiesenfeld, "Self-organized criticality", Physical Review a (General Physics), volume 38, number 1, pp. 364-74, 1 Jul. 1988. Examples of these critical behaviors have been observed in many different systems, including telecommunications networks as described in R. V. Sole, S. Valverde, "Information transfer and phase transitions in a model of Internet traffic" Physica A, volume 289, number 3-4, pages 595-605, 15 Jan. 2001. One of the features of criticality is that only a slight incremental change of a system parameter or structure can cause this change of behavior. This characteristic is obviously not desirable in a wireless network where such a catastrophic failure could bring down the whole network very suddenly and without warning.

Another challenge that is posed by using self-organizing networks is the difficulty of designing the algorithms themselves. Controlling the behavior of centralized networks is more straightforward as the behavior of the whole network is always known and can be changed directly. In self-organizing networks, producing the algorithm that would give rise to the desired emergent behavior for self-organization requires more careful consideration, since producing the desired emergent behavior cannot be done by simply telling the network nodes what to do directly.

The unpredictability of self-organizing systems thus poses difficulties when applied to wireless networks. It would be advantageous to be able to determine how the network would behave under different scenarios during the design of the network, for example to make sure that during the operation of the network there is some sufficient warning of unpredicted network behavior. Also if something goes wrong, it would be useful to be able to readily analyze the network behavior to find out the cause of the network failure.

To review, the use of self-organization in for example 4G networks is important. Mobile networks are evolving from using a centrally controlled architecture towards one with a more ad-hoc and dynamic character. In such networks, the coordination and management system has to cope with a network hierarchy, connectivity and node availability that is not clear and changes continuously. Distributed, decentralized controlled networks are ideal for use under these circumstances. Self-organizing behavior of these networks is capable of providing a very flexible and robust structure without using very complicated and expensive hardware and software, giving network providers the ability of providing high bandwidth services whilst keeping the cost of network deployment and management low. The difficulty of predicting the behavior of self-organizing networks, however, is an issue that can cause problems in decentralized networks. Self-organizing systems are sometimes known to exhibit critical behavior where, under certain circumstances, the behavior of the network changes very drastically. The difficulty of predicting the behavior also makes the design and optimization of these networks awkward.

SUMMARY OF THE INVENTION

An embodiment of the present invention provides a method of monitoring state of a telecommunications network comprising a plurality of nodes, each node being at a time in one of a number of node states dependent upon a predetermined set of rules and local conditions at that node, the method comprising determining the value of a parameter dependent upon entropy of the node states in the network.

Embodiments of the present invention thus provide entropy based complexity measurement for behavior analyzis of self-organizing telecommunication networks. Specifically, application of the entropy-based complexity measure in telecommunications networks is useful to examine behaviors of localized distributed algorithms. The behavior of self-organizing i.e. localized distributed algorithm (LDA) networks can thus be investigated to determine network-wide trends. Effects of parameters can be investigated that are not immediately apparent through other means of observation, and preferred embodiments can be useful guides for changing or tweaking parameters and localized distributed algorithms to optimize or produce a desired behavior. Detection and pinpointing of causes of unexpected and undesired behaviors are further advantages. Analyzis of telecommunications networks using a complexity metric that uses system state entropy gives an indication of the behavior of the network. The metric provides a tool that provides the ability to examine the critical behavior of the network when designing and optimizing the network, and also to provide advance warning on network failure.

Understanding the behavior of self-organizing wireless networks can provide a lot of different benefits. For example, self-organizing networks can store a library of many different simple algorithms that are activated under certain conditions to trigger different types of desired emergent behaviors, giving us even more flexibility in the control of the network.

Preferably the value of the parameter dependent upon entropy is determined dependent upon sufficient node states being determined as having been changed after filtering out of fluctuations having less than a predetermined duration. Preferred embodiments thus provide a filtering technique to extract a system behavior trend in a network.

Preferably the parameter is dependent upon entropy S normalized by the maximum entropy possible $S_{max}$. Preferably the parameter is complexity and is proportional to $$\frac{S}{S_{max}}\left(1 - \frac{S}{S_{max}}\right).$$

Preferably the local conditions at that node are the node states of at least one of the neighboring nodes to that node.

Preferably the network is a network for mobile telecommunications and the nodes are base stations. Preferably each base station operates according to a set of rules for automatic cell sizing defined in a local algorithm and takes at any one time one of three states in respect thereof. Preferably the three states are: cell sizing possible but not occurring, cell sizing occurring, and cell sizing not permitted.

The present invention also provides a corresponding telecommunications network. In particular, the present invention provides a telecommunications network comprising a complexity determinator and plurality of nodes, each node being at a time in one of a number of node states dependent upon a predetermined set of rules and local conditions at that node, the complexity determinator being operative to determine the value of a parameter dependent upon entropy of the node states in the network.

Preferably the determinator comprises a filter operative to filter out fluctuations having less than a predetermined duration, the determinator being operative to determine the value of the parameter dependent upon entropy dependent upon sufficient node states being determined as having been changed after filtering out of the fluctuations having less than the predetermined duration.

DETAILED DESCRIPTION

Figure 1:
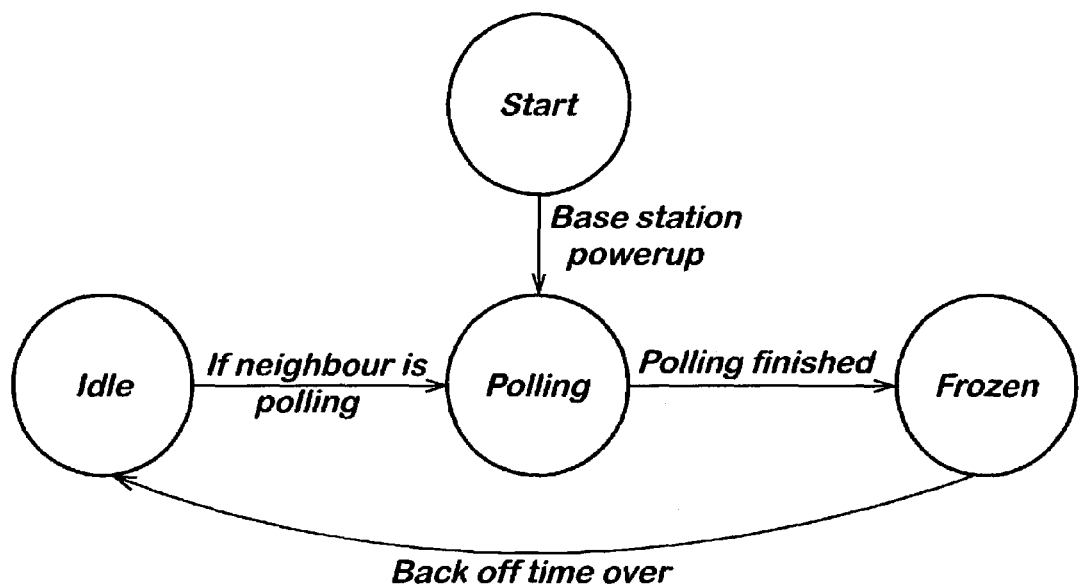
FIG. 1 is a diagram illustrating state transitions of a base station

The problems and difficulties of controlling decentralized networks are addressed by introducing a method of analyzing and handling the behavior of decentralized wireless networks using an entropy based complexity metric An entropy-based complexity metric is used to investigate the behavior of self-organizing systems in mobile networks. Complexity in this context means the minimal state representation of the system behavior. A complexity measure is applied to extract information on network-wide behavior, the particular example behavior being the self-organizing behavior involved in cell dimensioning. The metric is general enough for application in monitoring other behaviors, such as decentralized channel allocation behaviors, and is also applicable in other types of telecommunications networks.

To reiterate, a method is described below of monitoring the behavior of networks operating with self-organizing, highly distributed, localized algorithms using complexity metrics. The method uses entropy measurements of the network states to track the behavior of the network (e.g. chaotic, static, oscillating, or complex behaviors). The sampling of the system state is processed through a filtering mechanism so that the slight fluctuations in the network behavior are not recorded and only the global trend in the behavior is considered. Details are presented below, including an example of complexity measurement on an automated algorithm for setting the sizes of base station cells.

Complexity

The term complexity is often used in the study of large, distributed systems. A system is here considered as a collection of interacting, interconnecting subsystems, where each subsystem has a number of finite states. The complexity of the behavior of a system is defined in this context as the minimal representation of the behavior of the system. In other words, a system that has behavior that is simple to describe would have less complex behavior than that with a behavior that is more difficult to describe. Under this definition, a system that has a totally random behavior would have no complex behavior, as the behavior can be described easily as white noise. Totally static systems also possess no complex behavior, as its behavior is obviously also very easy to describe. More complex behaviors are those that lie between these two extremes. They do not have a very random nature, nor are they very static. They have a dynamic but correlated behavior, with persistent "structures" in the system state space.

Entropy

Knowing the complexity of the behavior of the system would give an insight into its behavior. Any changes in the basic behavior of the system as a whole would be able to be detected using a very general method that can be applied to many different systems. Various efforts at quantifying the complexity of the behavior have been made, with different approaches adopted to obtain the size of the representation of the system behavior. Of the several measures developed, one of the approaches that is taken is by deriving the complexity measure using the entropy S of the system:

$$S = -\sum_{i=1}^{N} p_i \log_{10} p_i, \quad \sum_{i=1}^{N} p_i = 1 \quad (1)$$

where $p_i$ is the probability that the system is in state i of N possible states.

The entropy of a system is a measure of how random the system behavior is. It takes into account how often a system visits different areas of the system state space, and if the system visits all the states with equal probability (i.e. totally random), then the entropy will be at maximum. Conversely, if the system only visits one state (i.e. totally static), the system entropy will be zero. The entropy will give us an indication of the size of the system state space, and this has a relationship with the size of the representation of the system behavior, as we know that maximum entropy gives us a perfectly random system, while zero entropy gives us a static system.

A Complexity Measure Based On Entropy

We introduce a complexity metric that is derived from the system entropy. The complexity C, is defined as:

$$C = \frac{4S}{S_{\max}}\left(1 - \frac{S}{S_{\max}}\right) \quad (2)$$

where S is the entropy of the system, and $S_{max}$ is the maximum possible entropy of the system that occurs when all states are equiprobable, i.e. when $$p_i = \frac{1}{N} \forall i$$

and is given by $\log_{10} N$. $S/S_{max}$ is basically the measured entropy normalized to the maximum entropy possible, and gives us a measure of the randomness of the system. This complexity metric indicates low complexity at both random and static behaviors.

Example Application in a Wireless Network Having Decentralized Control Of Cell Sizes By way of example, we apply the complexity measurements to a simple distributed algorithm for automatic cell dimensioning in a decentralized wireless telecommunications network. The algorithm is distributed in being operative at base station level and uses only local information and simple local rules at each base station. A base station increases its cell size slowly in an attempt to poll its neighbors. When a neighbor is able to detect a polling signal, it sends an acknowledgement to the originating cell. Once the polling cell reaches its maximum cell size, it refers to the list of acknowledgements it has received and adjusts its cell size accordingly (for example, to take a cell radius of just over half the distance to the nearest neighboring base station). If a base station is polled, then it will be triggered into the polling state as well, to reconfigure itself after a new neighbor has been switched on. The base stations are totally independent and autonomous, using no direct input from a central controller.

As shown in FIG. 1, each base station is in one of three possible states at any one time: either polling, in a frozen buffer state or in an idle state. After completing the polling of its neighbors, the base station configures its cell size (dependent upon the distance to its neighbor(s), for example such that the cell radius is set to be just over half the distance to the nearest neighboring base station) and enters the frozen buffer state for a fixed amount of time (called the back off time). This frozen buffer state is needed to prevent other neighboring base stations that have been powered on at the same time from triggering a newly configured base station from entering the polling state again, resulting in a situation where the base stations are triggering each other off without a chance of completing their polling state. During the frozen state, the base station cannot be triggered into entering a polling state by another base station. At an idle state, the base station has successfully configured itself and is receptive to being triggered to the polling state by a neighbor.

The 100 base stations in the network model that was used in the simulations are loosely arranged in a 10 by 10 grid, each placed at approximately 200 meter intervals and are powered on at randomly set times. The base stations are recorded as having one of three states: polling, idle or frozen.

With three states and 100 base stations, there are $3^{100}$, or approximately $10^{47}$ system states. Because of this huge amount of possible states, a state definition filter as described below is used to capture the basic trend of the network behavior, rather than the "raw" states.

Figure 2:
FIG. 2 is an illustration of the state space matrix of the network, M at a time instant.

The network state space can be defined by a matrix, M, where an element $M_{jk}$, which has a value of either 1 or 0, shows whether the network node j is in state k (whereupon the value of $M_{jk}$ is set to 1) or not (when $M_{jk}$ is set to 0). Since we use three node states (idle, polling and active), and 100 nodes, M is a 100×3 matrix. When recording the states of the network, we record, at each time step, a snapshot of the network state in the form of M, and pass it through a state definition filter to remove the slight fluctuations in the state space. FIG. 2 is an illustration of a snapshot of the state space matrix of the network, M. A white box indicates which of the three states a base station is currently in.

Filtering

Applying the entropy-based measure to the decentralized wireless network, several characteristics can be extracted from the results. When doing this, however, we use a state definition filter that removes any slight (i.e non-persistent)

fluctuations in the system state when we are recording the system behavior. The state definition filter causes only persistent behavior to be recorded so that it is the basic overall behavior of the system which is recorded. This is because we are interested only in the basic overall trend of the network behavior, and hence any insignificant changes in the system behavior are not taken into consideration.

In order to filter out the effects of the non-persistent state changes, the exponentially weighted moving average EWMA is used when recording the state of the system. The exponentially weighted moving average EWMA is calculated at every iteration using the formula:

$$A_{kt}=k(M_{kt}-A_{k(t-1)})+A_{k(t-1)}$$

where: $A_{kt}$ is the exponentially weighted moving average (EWMA) in cell k at time t.

$M_{kt}$ is the state of the base station at cell k whose values were described above.

K is the smoothing constant, $$K = \frac{2}{1+N}$$

and N is the number of samples in the EWMA average i.e. the number of time steps considered in the average (how many previous values of $M_k$ are considered).

The exponentially weighted moving average EWMA provides a record with a certain amount of memory. The amount of memory the exponentially weighted moving average EWMA has depends on the value of N. For the system state at time t, elements in the matrix $F_{kt}$ take a 1 or 0 value dependent upon whether the average for that base station is less than or greater than a threshold value:

$F_{kt}=1$ if $A_{kt}$ is greater than or equal to T $F_{kt}=0$ if $A_{kt}$ is less than T The value of the threshold T is set so as to determine how strict the state definition is. If T is high, then the EWMA, $A_{kt}$ would have to be at a high value to be recorded as a new allocation. In other words, the use of the channel concerned would then have to be very persistent for it to be taken into account in the state definition.

The process of obtaining $F_{kt}$ effectively filters out the desired amount of fluctuations. A check is then performed to determine if the overall structure of the allocation pattern has changed sufficiently to be classified as a transition to a new state. $F_{kt}$ is checked against $F_{k(t-1)}$ to determine how much change has happened between the two. If there is a sufficient amount of change, then $F_{kt}$ is set as the new system state. If the change is insufficient, then the system state remains as $F_{k(t-1)}$. This is done by calculating the percentage of elements in $F_{kt}$ that is different from $F_{k(t-1)}$ as follows:

$G_{kt}=G_{k(t-1)}$ if $P_t$ is less than or equal to D $G_{kt}=F_{kt}$ if $P_t$ is greater than D where $P_t$ is the percentage of elements in $F_{kt}$ that is different from $F_{k(t-1)}$, D is the required percentage of change that is needed to initiate a system state transition, and $G_{kt}$ is a smoothed record of the states $G_k$ over time t.

Upon a system state transition being determined the entropy S of the system is determined using equation 1 above by considering the filtered state of each node (base station). Using equation 2, the complexity measure value is then derived from the entropy value.

Using The Complexity Measure to Optimize Backoff Time in the Automated Setting of Cell Sizes The back off time (mentioned previously with respect to FIG. 2) should be set as short as possible, so that the base station will be receptive to either additions or removals of neighboring base stations. Setting the back off time too long would easily avoid the problem of two base stations continuously triggering each other off to reconfigure their respective cell size, but adds in the risk of the base station not being able to detect any changes made in the network. It is a parameter that has a significant impact on the behavior of the network, and in a large network, it is difficult to judge its effect. We examined the effect of varying back off time using the complexity metric (measure) which has the advantage of obtaining a network-wide view of the behavior in a straightforward manner.

When designing or optimizing the network, using this metric can be done offline (i.e. non-real time). The metric is able to show the changes in the network behavior, as a whole, which is useful when trying to discover how different network parameters and scenarios would affect the emergent global behavior of the network. Critical points where the network behavior changes can be identified and avoided.

Using the metric in real time as the network is operating (i.e. online) can also be done, using measurements that are calculated over a fixed moving window to obtain the "real-time" entropy of the system.

Figure 3:
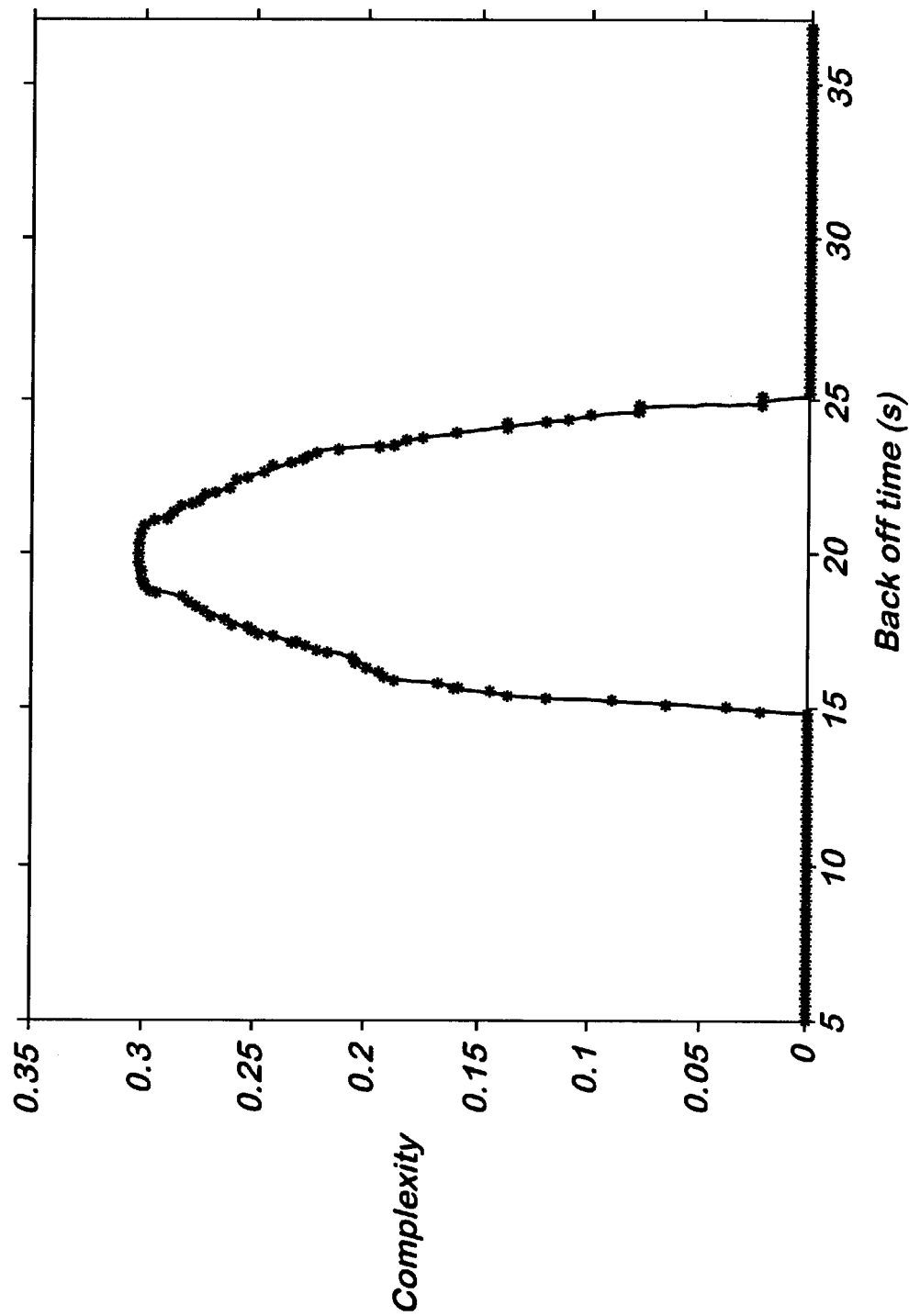
FIG. 3 shows complexity of network behavior vs. back off time for a simulated network.

FIG. 3 shows complexity of network vs. back off time (a network parameter) as simulated using the computer model. The cell dimensioning algorithm was iterated 3000 times for each back off time value, with back off time values ranging from 5 to 37 seconds in 0.1 second increments. In polling, cell size increments of 0.1 meters per iteration were used.

As shown in FIG. 3, to the left of the hump, the network behaves randomly, to the right of the hump, the network is static after setting of cell sizes (self organizing). It was observed that if the back off time as set below 14.8 seconds, the network never self-organizes in terms of cell sizes and remains in a random or periodic state. Above 14.8 seconds, the network begins to gain self-organizing behavior, with the chance of reaching a self-organized state increasing as the back off time is increased. If set above 24.9 seconds, the system would always become self-organized. This is reflected in the measured behavior complexity, which shows the transition from one behavior to another. The minimum backoff time which allows self-organization is thus 24.9 seconds in this example and so 25 seconds is selected.

Figure 4B:
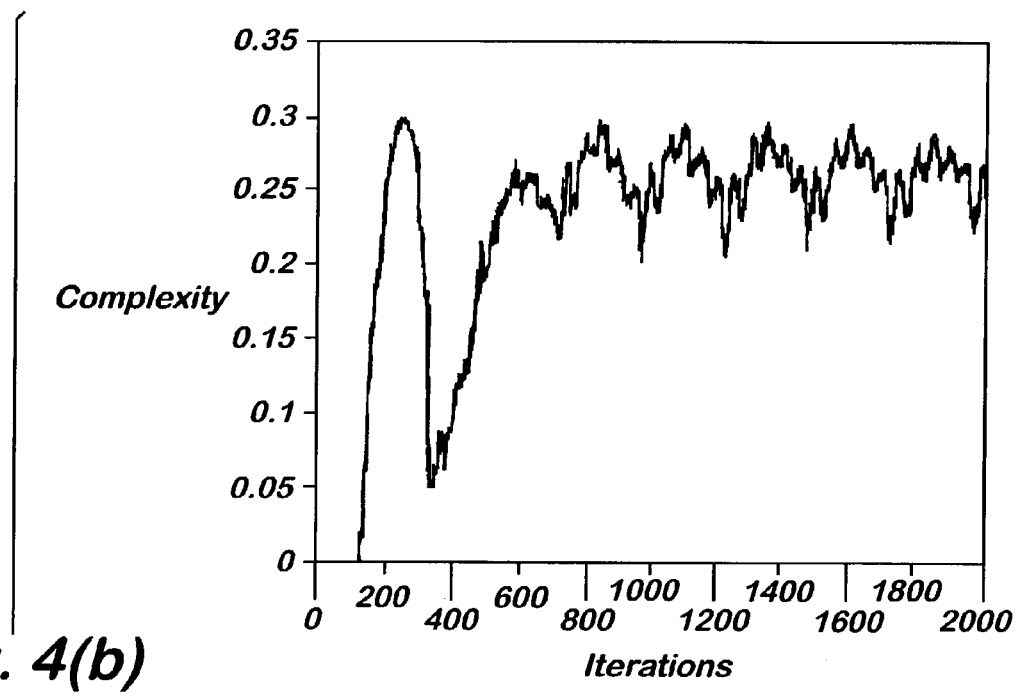
FIG. 4 shows on-line complexity measurement graphs and the corresponding cell boundary diagrams, with back-off time set to (a) 15 seconds, (b) 20 seconds, and (c) 25 seconds.
Figure 4B:
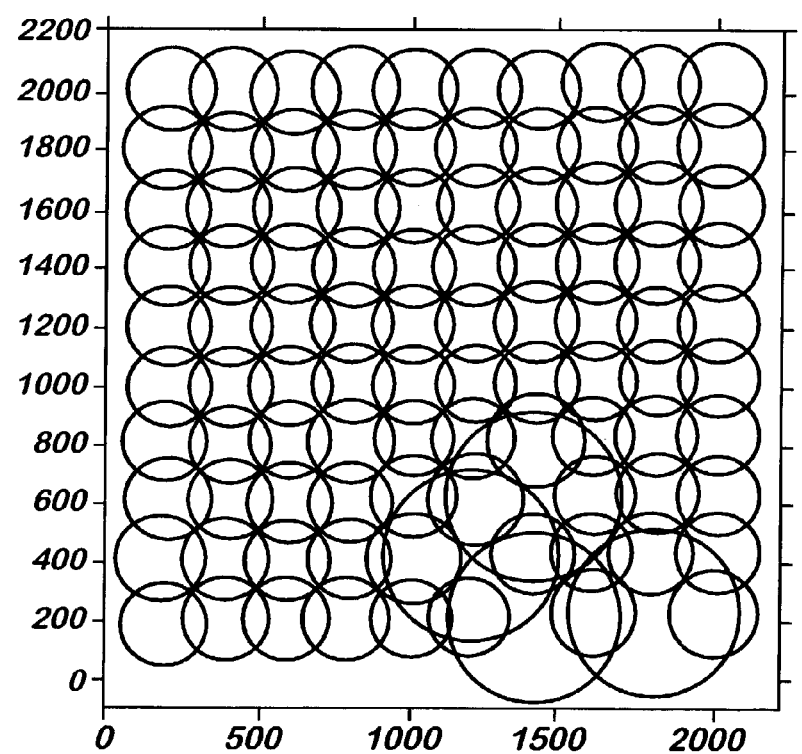
Figure 4C:
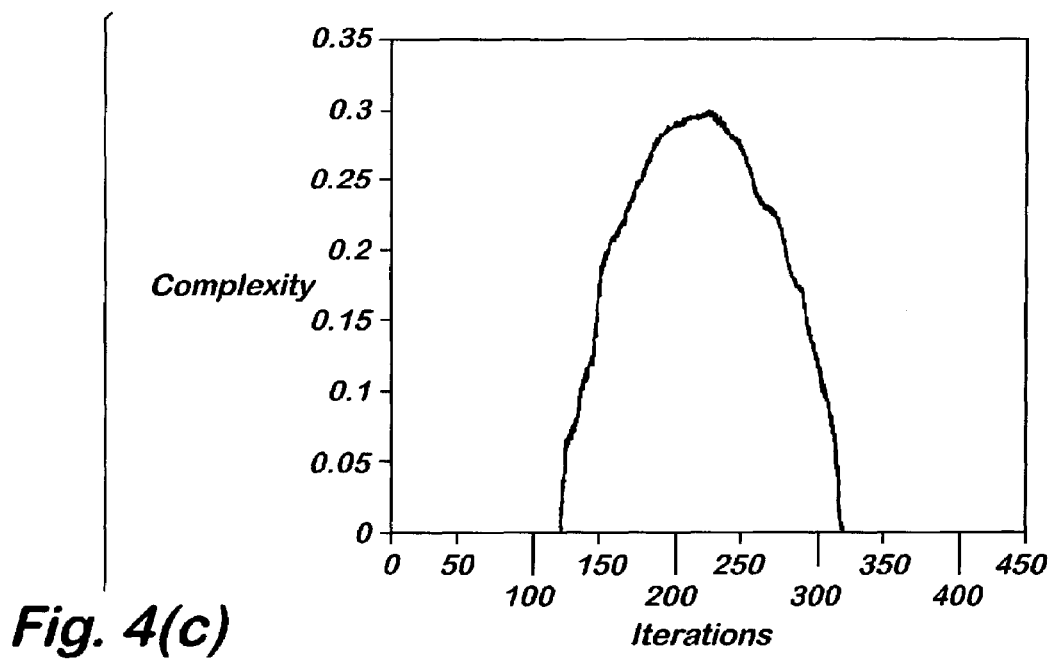
Figure 4C:
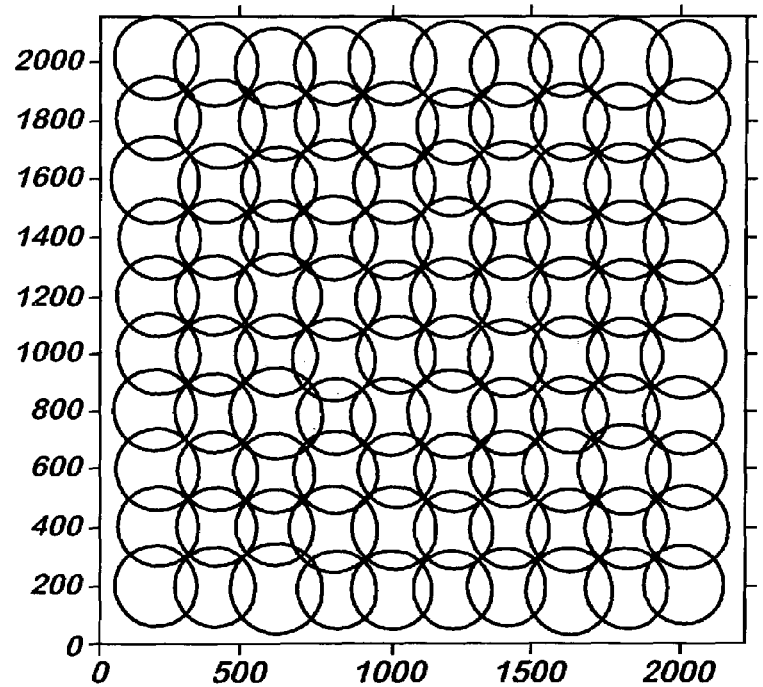

With the on-line complexity measurements, the network nodes are able to get some form of advance warning of unexpected behavior. When the state space starts to increase quickly, reflected in a jump in the complexity metric values, this shows the start of a phase transition. FIG. 4 shows the on-line complexity measurements displaying different behaviors when the back off time is changed to show the effects of the critical points obtained in FIG. 3. The three different behaviors are observed when the back off time is set to 15, 20 and 25 seconds. The network shows chaotic behavior with a back off time of 15 seconds, while at 20 seconds, the network begins to self-organize, but isolated random behavior starts to ripple out to the whole network, causing periodic behavior. Finally, at 25 seconds, all the network nodes are able to organize themselves at the first time, with no undesirable interruptions. FIG. 4 also shows the cell boundaries resulting from the cell dimensioning algorithm. It is important to note that FIGS. 4a and 4b are snapshots of the cell-boundaries, with the boundaries still pulsing, while in FIG. 4c, the cell boundaries are static.

Figure 5B:
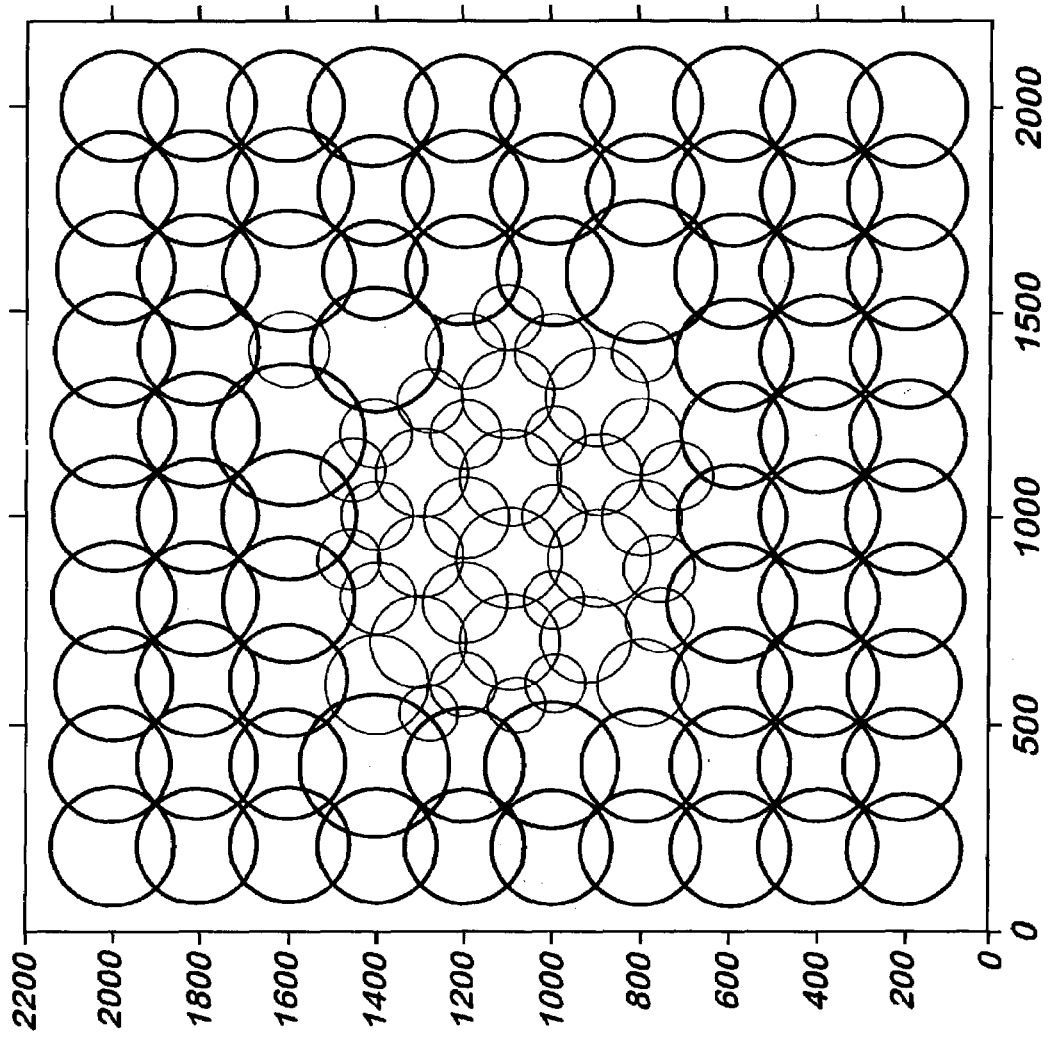
FIG. 5 shows (a) On-line complexity measure values during operation of the simulated network, back off time set to 25 seconds, one iteration being 0.6 seconds, and further base stations being added at 650 iterations; and shows (b) the resulting cell configuration with the further base stations.

FIG. 5 shows (a) on-line complexity measure values during operation of the network, back off time set to 25 seconds, one iteration being 0.6 seconds, and further base stations being added at 650 iterations. FIG. 5 also shows (b) the resulting cell configuration with the further base stations added. FIG. 5(a) gives an indication of how fast the network is able to adapt to changes in the network topology. The online measurements illustrate how quickly the network goes back into its organized behavior. The first hump in the graph shows the initial self-organization occurring when the base stations are switched on, before reaching the desired state. At 650 iterations, base stations are added into the network (to cope with hotspots in demand, or increase coverage), triggering the existing base stations to change their configurations. The graph clearly shows the dynamics of the reconfiguration. FIG. 5(b) shows the resulting configuration of the cell boundaries with the added base stations.

An application in respect of a wireless network has been described in detail. Of course, this development need not be restricted to use in wireless networks but can be applied in many different networks in telecommunications, from the Internet to conventional voice telephony.

The specific example described in detail relates to cell size setting. Other behaviors could be evaluated using the entropy-based complexity measure such as appropriate selection of channels at a base station so as to minimize co-channel interference with nearby base stations.

The above described embodiment is illustrative of the principles of the present invention. Other embodiments could be devised by those skilled in the art without departing from the spirit and scope of the present invention.

The invention claimed is:

1. A method of monitoring state of a telecommunications network comprising a plurality of nodes, each node being at a time in one of a number of node states dependent upon a predetermined set of rules and local conditions at that node, the method comprising determining the value of a parameter dependent upon entropy of the node states in the network.

2. The method according to claim 1 wherein the value of the parameter dependent upon entropy is determined dependent upon sufficient node states being determined as having been changed after filtering out of fluctuations having less than a predetermined duration.

3. The method according to claim 1 wherein the parameter is dependent upon entropy S mormalized by a maximum entropy possible $S_{max}$.

4. The method according to claim 3 in which the parameter is complexity and is proportional to $$\frac{S}{S_{\max}}\left(1 - \frac{S}{S_{\max}}\right).$$

5. The method according to claim 1 wherein the local conditions at that node are the node states of at least one of the neighboring nodes to that node.

6. The method according to claim 1 wherein the network is a network for mobile telecommunications and the nodes are base stations.

7. The method according to claim 6 wherein each base station operates according to a set of rules for automatic cell sizing defined in a local algorithm and takes at any one time one of three states in respect thereof.

8. The method according to claim 7 wherein the three states are: cell sizing possible but not occurring, cell sizing occurring, and cell sizing not permitted.

9. A telecommunications network comprising a complexity determinator and plurality of nodes, each node being at a time in one of a number of node states dependent upon a predetermined set of rules and local conditions at that node, the complexity determinator being operative to determine the value of a parameter dependent upon entropy of the node states in the network.

10. The telecommunications network according to claim 9 wherein the determinator comprises a filter operative to filter out fluctuations having less than a predetermined duration, the determinator being operative to determine the value of the parameter dependent upon entropy dependent upon sufficient node states being determined as having been changed after filtering out of the fluctuations having less than the predetermined duration.

* * * * *